United States Patent
Shimizu

(10) Patent No.: US 9,854,413 B2
(45) Date of Patent: Dec. 26, 2017

(54) MOBILE COMMUNICATION TERMINAL, COMMUNICATION METHOD, AND COMMUNICATION SYSTEM

(71) Applicant: KYOCERA Corporation, Kyoto-shi, Kyoto (JP)

(72) Inventor: Ryohei Shimizu, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/411,897

(22) PCT Filed: Jun. 18, 2013

(86) PCT No.: PCT/JP2013/003785
§ 371 (c)(1),
(2) Date: Apr. 27, 2015

(87) PCT Pub. No.: WO2014/002427
PCT Pub. Date: Jan. 3, 2014

(65) Prior Publication Data
US 2015/0237483 A1    Aug. 20, 2015

(30) Foreign Application Priority Data
Jun. 27, 2012    (JP) .................. 2012-144158

(51) Int. Cl.
*H04B 7/00*    (2006.01)
*H04W 4/10*    (2009.01)
*H04L 12/58*    (2006.01)

(52) U.S. Cl.
CPC ............. *H04W 4/10* (2013.01); *H04L 51/26* (2013.01)

(58) Field of Classification Search
CPC ................. H04L 51/26; H04W 4/10
(Continued)

(56) References Cited

U.S. PATENT DOCUMENTS

2006/0030344 A1*  2/2006  Lim ................... H04W 4/10
                                                      455/512
2006/0035630 A1*  2/2006  Morishima .......... H04M 3/56
                                                      455/416
(Continued)

FOREIGN PATENT DOCUMENTS

JP    2000-504182 A    4/2000
JP    2006-042355 A    2/2006
(Continued)

OTHER PUBLICATIONS

International Search report dated Sep. 3, 2013 issued in counterpart International application No. PCT/JP2013/003785.

*Primary Examiner* — Raj Chakraborty
(74) *Attorney, Agent, or Firm* — Procopio Cory Hargreaves and Savitch LLP

(57) ABSTRACT

A mobile communication terminal used in a communication system in which audio based on an audio signal transmitted from a given mobile communication terminal having speaking rights is output from another mobile communication terminal, the given mobile communication terminal being selected by a server storing priority rank information indicating a priority rank pertaining to acquisition of the speaking rights for each of a plurality of mobile communication terminals, the mobile communication terminal including a rank signal receiver receiving, from the server, a priority rank signal based on the priority rank information stored by the server and indicating the priority rank for at least a subset of the mobile communication terminals and a display displaying a terminal priority rank based on the priority rank signal when the rank signal receiver receives the priority rank signal.

9 Claims, 19 Drawing Sheets

(58) Field of Classification Search
USPC .......................................................... 455/512
See application file for complete search history.

(56) References Cited

U.S. PATENT DOCUMENTS

| | | | |
|---|---|---|---|
| 2007/0060181 A1 | 3/2007 | Shen | |
| 2008/0004038 A1* | 1/2008 | Dunko | H04W 4/08 455/456.1 |
| 2008/0170703 A1* | 7/2008 | Zivney | H04M 1/6016 381/2 |
| 2012/0142367 A1* | 6/2012 | Przybylski | H04W 4/046 455/456.1 |

FOREIGN PATENT DOCUMENTS

| | | |
|---|---|---|
| JP | 2007-036876 A | 2/2007 |
| WO | 97/28658 A2 | 8/1997 |

\* cited by examiner

FIG. 5

Terminal group table 500

| Group ID 510 | Group name 520 | Name 540 | Rank 550 | Sub-rank 560 | Speaking flag 570 | Waiting-to-speak flag 580 | User flag 590 |
|---|---|---|---|---|---|---|---|
| 001 | Dept. A, Section B | User A | 1 | 1 | 1 | 0 | 0 |
| | | User B | 2 | 1 | 0 | 1 | 0 |
| | | User C | 2 | 2 | 0 | 0 | 0 |
| | | User D | 3 | 1 | 0 | 1 | 1 |

Rank change request table 800

| Group ID | Name | Rank | Sub-rank |
|---|---|---|---|
| 001 | User A | 1 | 1 |
| | User B | 3 | 1 |
| | User C | 3 | 2 |
| | User D | 2 | 1 |

FIG. 10

Server group table 1000

| Group ID 1010 | Group name 1020 | Update permission flag 1030 | Name 1040 | Rank 1050 | Sub-rank 1060 | Speaking flag 1070 | Waiting-to-speak flag 1080 | Update rights flag 1090 |
|---|---|---|---|---|---|---|---|---|
| 001 | Department A, Section B | 1 | User A | 1 | 1 | 1 | 0 | 1 |
|  |  |  | User B | 2 | 1 | 0 | 1 | 1 |
|  |  |  | User C | 2 | 2 | 0 | 0 | 1 |
|  |  |  | User D | 3 | 1 | 0 | 1 | 1 |
| 002 | ABC Club | 1 | User E | 1 | 1 | 1 | 0 | 1 |
|  |  |  | User F | 1 | 2 | 0 | 0 | 1 |
|  |  |  | User G | 2 | 1 | 0 | 1 | 0 |
|  |  |  | ... | ... | ... | ... | ... | ... |
| 003 | Product Z Sales Team | 0 | User H | 1 | 1 | 0 | 0 | 1 |
|  |  |  | ... | ... | ... | ... | ... | ... |
| ... | ... | ... | ... | ... | ... | ... | ... | ... |

FIG. 16

Server group table 1600

| Group ID 1010 | Group name 1020 | Update permission flag 1030 | Name 1040 | Rank 1050 | Sub-rank 1060 | Speaking flag 1070 | Waiting-to-speak flag 1080 | Update rights flag 1090 | Waiting-to-speak rank 1695 |
|---|---|---|---|---|---|---|---|---|---|
| 001 | Department A, Section B | 1 | User A | 1 | 1 | 1 | 0 | 1 | – |
| | | | User B | 2 | 1 | 0 | 1 | 1 | 1 |
| | | | User C | 2 | 2 | 0 | 0 | 1 | – |
| | | | User D | 3 | 1 | 0 | 1 | 1 | 2 |
| 002 | ABC Club | 1 | User E | 1 | 2 | 1 | 0 | 1 | – |
| | | | User F | 1 | 1 | 0 | 0 | 1 | – |
| | | | User G | 2 | 1 | 0 | 1 | 0 | – |
| | | | ... | ... | ... | ... | ... | ... | ... |
| 003 | Product Z Sales Team | 0 | User H | 1 | 1 | 0 | 0 | 1 | – |
| | | | ... | ... | ... | ... | ... | ... | ... |
| ... | ... | ... | ... | ... | ... | ... | ... | ... | ... |

FIG. 18

Terminal group table 1800

| Group ID 510 | Group name 520 | Name 540 | Rank 550 | Sub-rank 560 | Speaking flag 570 | Waiting-to-speak flag 580 | User flag 590 | Waiting-to-speak rank 1895 |
|---|---|---|---|---|---|---|---|---|
| 001 | Dept. A, Section B | User A | 1 | 1 | 1 | 0 | 0 | – |
| | | User B | 2 | 1 | 0 | 1 | 0 | 1 |
| | | User C | 2 | 2 | 0 | 0 | 0 | – |
| | | User D | 3 | 1 | 0 | 1 | 1 | 2 |

MOBILE COMMUNICATION TERMINAL, COMMUNICATION METHOD, AND COMMUNICATION SYSTEM

TECHNICAL FIELD

The present disclosure pertains to technology for a mobile communication terminal having a Push-to-Talk (hereinafter, PTT) call function.

BACKGROUND ART

Conventionally, PTT calls are a form of calling.

In a PTT call, a given mobile communication terminal belonging to a group among a plurality of mobile communication terminals is granted speaking rights by a server managing the PTT call, and audio based on an audio signal from the given mobile communication terminal is output to the other mobile communication terminals in the group (e.g., see Patent Literature 1 and 2). In the PTT call, when a plurality of the mobile communication terminals make a request for speaking rights, the server grants the speaking rights to one of the mobile communication terminals among the requesting terminals having the highest priority rank for assigning the speaking rights.

CITATION LIST

Patent Literature

[Patent Literature 1]
Japanese Patent Application Publication No. 2007-36876
[Patent Literature 2]
Japanese Patent Application Publication No. 2006-42355

SUMMARY OF INVENTION

Technical Problem

Typically, during a PTT call, a user using a mobile communication terminal that does not have speaking rights may make a request to the server for the speaking rights to be granted to the user's terminal. However, when a request for the speaking rights has already been made by another terminal having a higher priority rank than the user's terminal, then the user must wait for the speaking rights until the user's terminal has the highest priority rank among the mobile communication terminals making the request.

Nevertheless, the user involved in the PTT call is unable to easily discover the priority rank of the mobile communication terminals participating in the PTT call. Thus, when making the request to the server for speaking rights to be granted to the user's terminal, the user is unable to easily know how much more time to wait until the user's terminal is granted the speaking rights.

In consideration of the above-described problem, the present disclosure aims to provide a mobile communication terminal with which user is more likely to know, in comparison to conventional technology, how much longer to wait before speaking rights are granted to the user's terminal when the user has made a request to the server for the speaking rights to be granted during the PTT call.

Solution to Problem

In order to address the above-described problem, the present disclosure provides a mobile communication terminal used in a communication system in which audio based on an audio signal transmitted from a given mobile communication terminal having speaking rights is output from another mobile communication terminal, the given mobile communication terminal being selected by a server storing priority rank information indicating a priority rank pertaining to acquisition of the speaking rights for each of a plurality of mobile communication terminals, the mobile communication terminal comprising: a rank signal receiver receiving, from the server, a priority rank signal based on the priority rank information stored by the server and indicating the priority rank for at least a subset of the mobile communication terminals; and a display displaying a terminal priority rank based on the priority rank signal when the rank signal receiver receives the priority rank signal

Advantageous Effects of Invention

According to the mobile communication terminal pertaining to the disclosure, the priority rank is at least partially displayed on the display unit. Thus, a mobile communication device, communication method, and communication system are provided in which, during a PTT call, a user is more likely to know how much longer to wait before speaking rights are granted to the user's terminal, in comparison to conventional technology.

BRIEF DESCRIPTION OF DRAWINGS

FIG. 5 shows the data configuration of a terminal group table 500.

FIG. 10 shows the data configuration of a server group table 1000.

FIG. 16 shows the data configuration of a server group table 1600.

FIG. 18 shows the data configuration of a terminal group table 1800.

DESCRIPTION OF EMBODIMENTS (Embodiment)

(Overview)

A push-to-talk terminal (hereinafter, PTT terminal) 100, which is a smartphone having a PTT call function, and a push-to-talk call system (hereinafter, PTT call system) 120 made up of a plurality of the PTT terminal 100 are described below, as examples of the mobile communication terminal pertaining to the disclosure.

Figure 1:
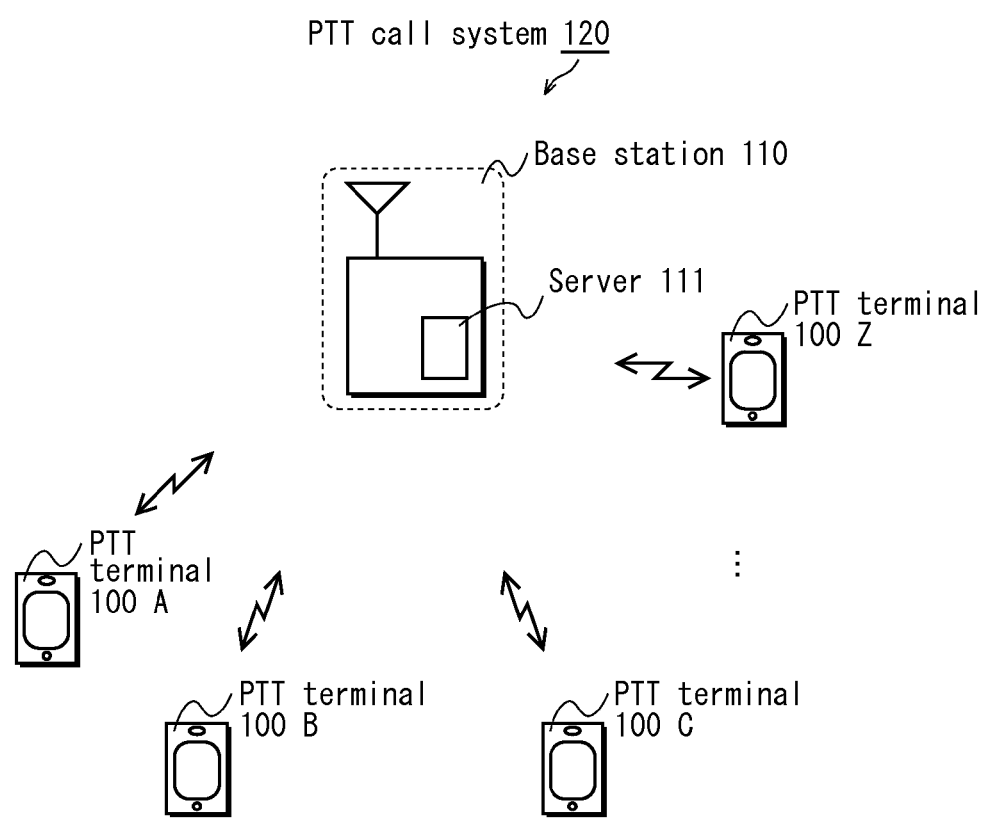
FIG. 1 shows an overall schematic view of a PTT call system 120.

FIG. 1 shows an overall configuration of the PTT call system 120 that includes a the PTT terminal 100 in plurality.

As shown, the PTT call system 120 is made up of the PTT terminals 100 (PTT terminals 100A through 100Z) and a base station 110.

The base station 110 includes a server 111 that manages PTT calls made in the PTT call system 120.

The PTT call system 120 includes a plurality of groups to which the PTT terminals 100 belong. Any given PTT call is performed among the PTT terminals 100 belonging to one of the groups as designated by the server 111.

Each PTT terminal 100 communicates with the other PTT terminals 100 in the group via the base station 110. When participating in the PTT call, a given PTT terminal displays, on a touch panel, a priority rank pertaining to the right to speak (hereinafter, speaking rights priority rank) for each terminal participating in the call, according the server managing the PTT call.

The PTT call system 120 is described in detail below, with reference to the accompanying drawings.

(Configuration)

(PTT Terminal 100)

Figure 2:
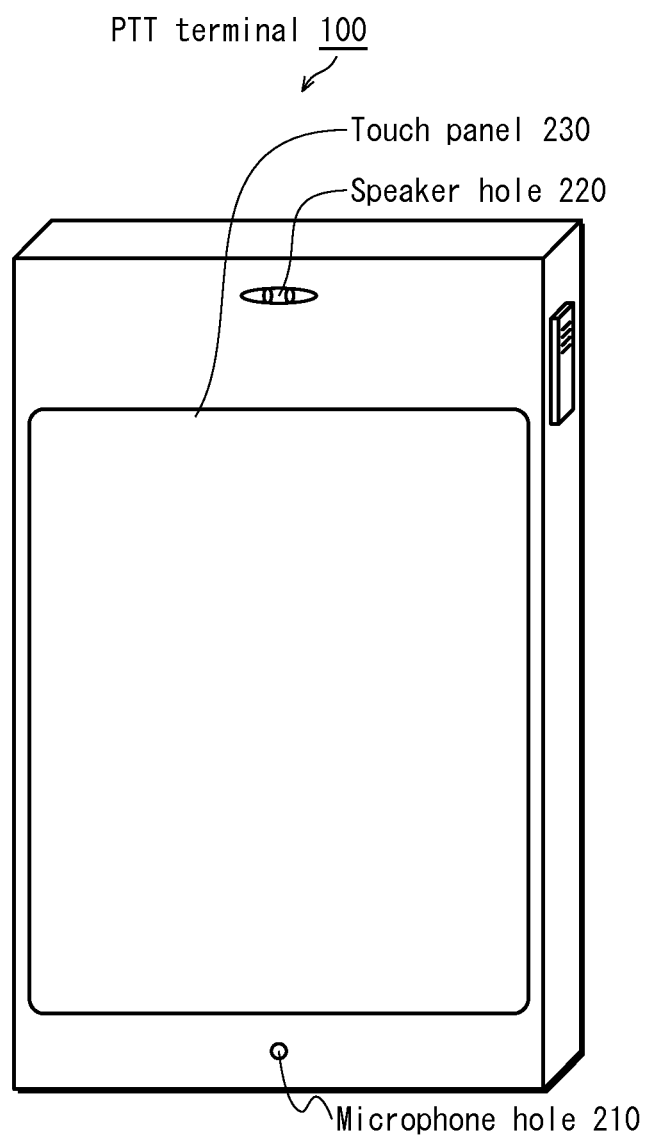
FIG. 2 shows a perspective view of the external appearance of a PTT terminal 100.

FIG. 2 shows a perspective view of the external appearance of the PTT terminal 100.

As shown, the PTT terminal 100 is a mobile communication terminal in the form of a smartphone, having a casing that is substantially shaped as rectangular prism. A main face of the casing is provided with a microphone hole 210, a speaker hole 220, and a touch panel 230.

Figure 3:
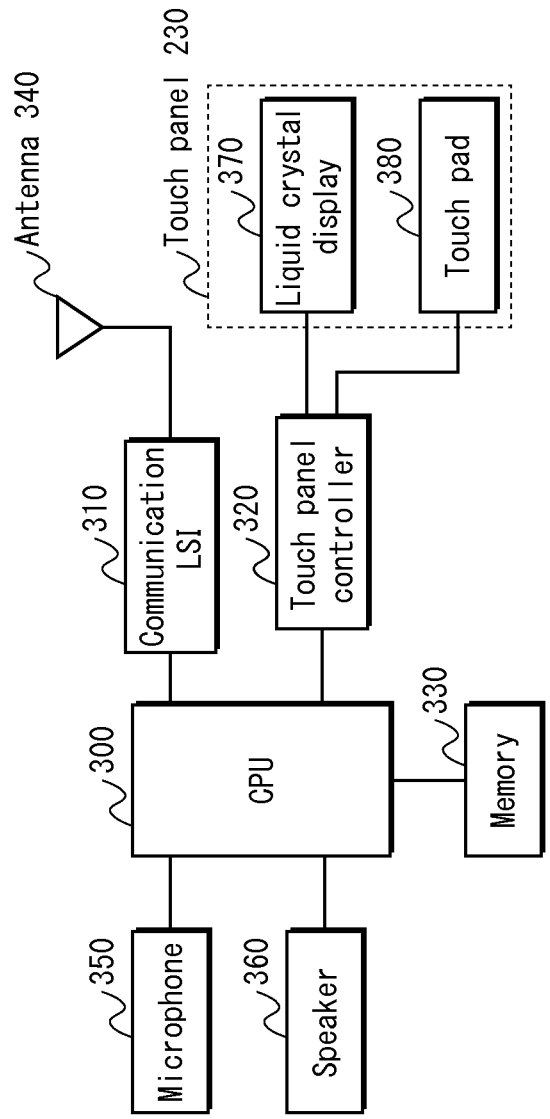
FIG. 3 is a block diagram showing the circuit configuration of the PTT terminal 100.

FIG. 3 is a block diagram showing the circuit configuration of the PTT terminal 100.

As shown, the PTT terminal 100 includes a central processing unit (hereinafter, CPU) 300, a communication Large-Scale Integration (hereinafter, LSI), 310, a touch panel controller 320, a memory 330, an antenna 340, a microphone 350, a speaker 360, and the touch panel 230. The touch panel 230 includes a touch pad 380 superposed over a display surface of a liquid crystal display 370.

The microphone 350 is connected to the CPU 300, converts audio input through the microphone hole 210 (see FIG. 2) from outside the casing into an electrical signal, and transfers the converted electrical signal to the CPU 300.

The speaker 360 is connected to the CPU 300, is controlled by the CPU 300, converts en electrical signal transmitted by the CPU 300 into audio, and outputs the converted audio through the receiver hole 220 (see FIG. 2) to outside the casing.

The antenna 340 is connected to the communication LSI 310, and is used when the communication LSI 310 performs communication, being a monopole antenna made of a thin metal film, for example.

The communication LSI 310 is connected to the antenna 340 and the CPU 300, and is controlled by the CPU 300. The communication LSI 310 modulates a transmit signal from the CPU 300, transmits the modulated signal to the base station 110 using the antenna 340, receives a signal transmitted by the base station 110 using the antenna 340, and demodulates a received signal for transfer to the CPU 300.

The liquid crystal display 370 is connected to the touch panel controller 320 and is controlled by the touch panel controller 320.

The touch pad 380 is connected to the touch panel controller 320 and is controlled by the touch panel controller 320. The touch pad 380 is made from an optically transmissive electrode (e.g., indium tin oxide (hereinafter, ITO)). The touch panel 230 is formed by overlaying the touch pad 380 on the display surface of the liquid crystal display 370.

The touch panel controller 320 is connected to the CPU 300, the liquid crystal display 370, and the touch pad 380, and is controlled by the CPU 300. The touch panel controller 320 displays an image based on an image signal sent from the CPU 300 on the liquid crystal display 370, and receives an operation made by the user of the PTT terminal 100 by converting the user operation made using the touch pad 380 into an electrical signal for the CPU 300.

The memory 330 is connected to the CPU 300 and includes, random access memory (hereinafter, RAM), read-only memory (hereinafter, ROM), and a removable flash memory. The memory 330 stores programs pertaining to the functions executed by the CPU 300 and data used by the CPU 300 when executing the programs. The functions realized by the CPU 300 include the aforementioned display and operation receipt.

The CPU 300 is connected to the communication LSI 310, the touch panel controller 320, the memory 330, the antenna 340, the microphone 350, and the speaker 360, controls the communication LSI 310, the touch panel controller 320, and the speaker 360 by executing the programs stored in the memory 330, and performs the display of rank and setting of terminal priority as described below.

The display of rank is performed by a given PTT terminal 100 participating in a PTT call, and involves receiving a (later-described) priority rank signal from the server 111 for the PTT terminals participating in the PTT call, and displaying, in accordance with the received priority rank signal, a (later-described) PTT call screen on the liquid crystal display 370 to indicate the speaking rights priority rank of the PTT terminals participating in the PTT call. The display of rank is executed when the CPU 300 executes a program stored in the memory 330 and has the PTT terminal 100 execute a later-described rank display process. The rank display process is described later, in a section titled Rank Display Process, with reference to an accompanying flowchart.

The setting of terminal priority rank involves receiving a request to change the speaking rights priority order for the PTT terminals participating in the PTT call, including the given PTT terminal 100, and transferring a (later-described) rank change request signal based on the received request to the server 111. The display of rank is executed when the CPU 300 executes a program stored in the memory 330 and has the PTT terminal 100 execute the later-described terminal priority rank setting process. The setting of the terminal priority rank is described in detail later in the section titled Terminal Priority Rank Setting, with reference to the accompanying flowchart.

The PTT terminal 100 having the above-described circuit configuration has a functional configuration as described below, with reference to the accompanying drawings.

Figure 4:
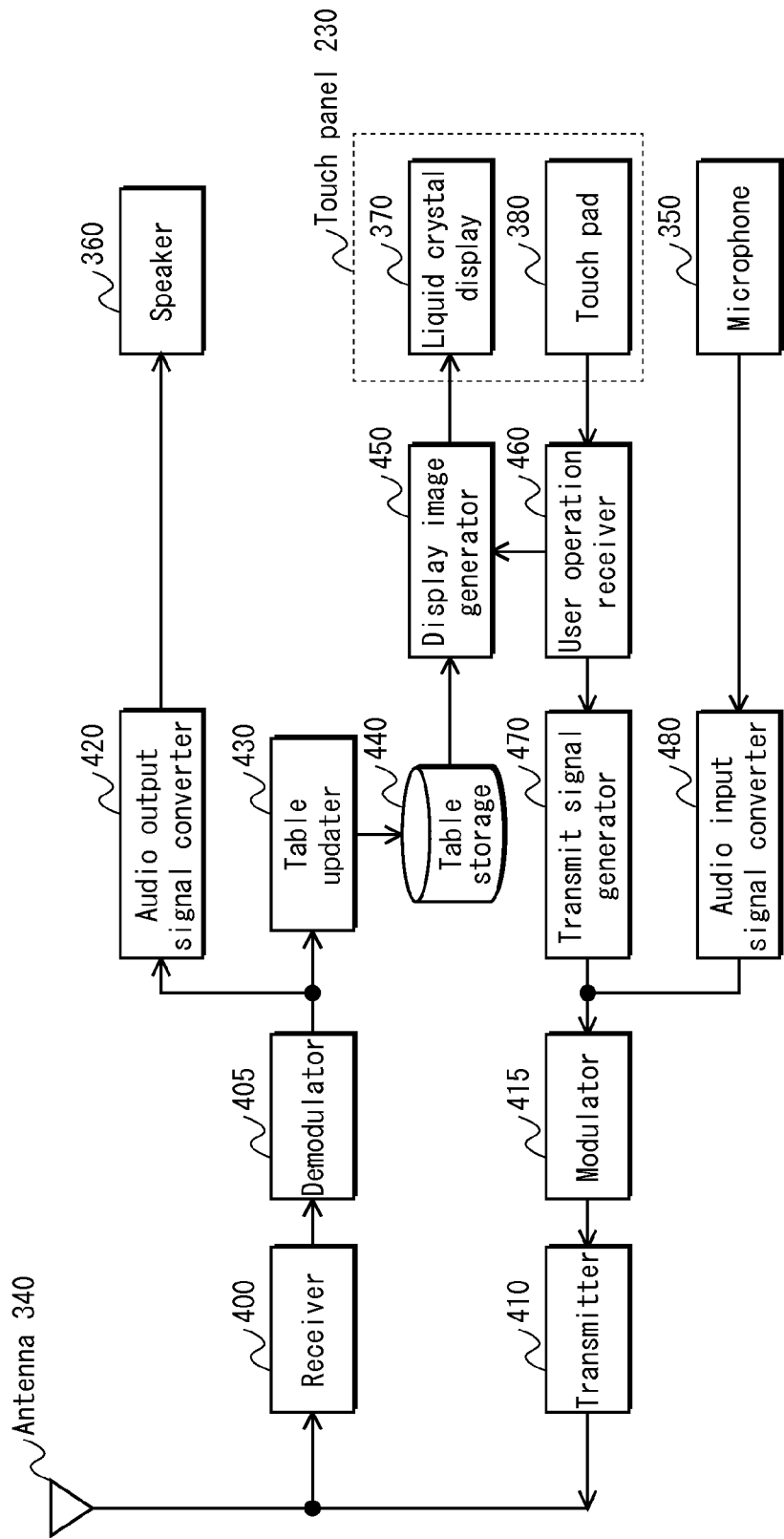
FIG. 4 is a block diagram showing the main functional configuration of the PTT terminal 100.

FIG. 4 is a functional block diagram showing the main functional blocks realizing the functions of the PTT terminal 100.

As shown, the PTT terminal 100 includes a receiver 400, a demodulator 405, a transmitter 410, a modulator 415, an audio output signal converter 420, a table updater 430, a table storage 440, a display image generator 450, a user operation receiver 460, a transmit signal generator 470, an audio input signal converter 480, the antenna 340, the microphone 350, the speaker 360, the liquid crystal display 370, and the touch pad 380. The PTT terminal 100 configured as described above is described below.

The receiver 400 is connected to the antenna 340 and the demodulator 405, and is a component of the communication LSI 310 controlled by the CPU 300. The receiver 400 uses the antenna 340 to receive a signal in a predetermined frequency band (e.g., 2 GHz) transmitted from the base station 110.

The demodulator 405 is connected to the receiver 400, the audio output signal converter 420, and the table updater 430, and is a component of the communication LSI 310 controlled by the CPU 300. The demodulator 405 demodulates the signal received by the receiver 400 in accordance with a predetermined algorithm.

The audio output signal converter 420 is connected to the demodulator 405 and the speaker 360, and is realized by the CPU 300. The audio output signal converter 420 converts an audio signal within the signal demodulated by the demodulator 405 into a electrical signal for producing sound through the speaker 360 and outputs the converted signal to the speaker 360.

The table storage 440 is connected to the table updater 430 and the display image generator 450, and is a memory area in the memory 330 managed by the CPU 300. The table storage 440 stores a terminal group table 500.

The terminal group table 500 is described in detail below, with reference to FIG. 5. FIG. 5 shows the data configuration of the terminal group table 500 stored in the table storage 440.

As shown, the terminal group table 500 includes a group ID column 510, a group name column 520, a name column 540, a rank column 550, a sub-rank column 560, a speaking flag column 570, a waiting-to-speak flag column 580, and a user flag column 590, stored in correspondence.

The group ID column 510 stores an ID identifying the group.

The group name column 520 stores a name of the group identified by the corresponding entry in the group ID column 510.

The name column 540 stores the name of a user using each PTT terminal 100 belonging to the group identified by the corresponding entry in the group ID column 510.

The rank column 550 indicates a speaking rights priority rank for the PTT terminal 100 used by the user named in the corresponding entry of the name column 540. The speaking rights priority rank shows higher priority with smaller numbers.

The sub-rank column 560 indicates an auxiliary speaking rights priority rank for the PTT terminal 100 used by the user named in the corresponding entry of the name column 540. The auxiliary speaking rights priority rank is a priority rank for assigning speaking rights to a plurality of PTT terminals 100 having the same speaking rights priority rank. The auxiliary speaking rights priority rank shows higher priority with smaller numbers.

The speaking flag column 570 stores a flag that indicates whether or not the PTT terminal 100 used by the user identified in the corresponding entry of the name column 540 has been assigned speaking rights. Here, a Boolean value of one indicates that speaking rights have been assigned.

The waiting-to-speak flag column 580 stores a flag that indicates whether or not the PTT terminal 100 used by the user identified in the corresponding entry of the name column 540 is waiting to speak. The PTT terminal 100 is waiting to speak when speaking rights have not been assigned to the PTT terminal 100, regardless of whether or not the user has touched a (later-described) PTT button icon displayed on the liquid crystal display 370 of the PTT terminal 100. Here, a Boolean value of one indicates that the terminal is waiting to speak.

The user flag column 590 stores a flag that indicates whether or not the PTT terminal 100 is the terminal being used by the user identified in the corresponding entry of the name column 540. Here, a Boolean value of one indicates that the terminal is being used by the user.

The explanation of the functional blocks resumes, with a return to FIG. 4.

The table updater 430 is connected to the demodulator 405 and the table storage 440, and is realized by the CPU 300. The table updater 430 generates the terminal group table 500 from the priority rank signal within the signal demodulated by the demodulator 405, and updates the terminal group table 500 stored in the table storage 440 with the generated terminal group table 500. The priority rank signal indicates a (later-described) server group table 1000 stored by the server 111 and includes all the information in the terminal group table 500.

The display image generator 450 is connected to the table storage 440, the user operation receiver 460, and the liquid crystal display 370, is realized by the CPU 300, and performs functions of displaying a PTT in-call image and displaying a rank change request reception image, as described below.

The PTT in-call image display is performed when the terminal is in a PTT call, and involves generating a PTT in-call image based on the terminal group table 500 stored in the table storage 440 and displaying the generated image on the liquid crystal display 370.

Figure 6:
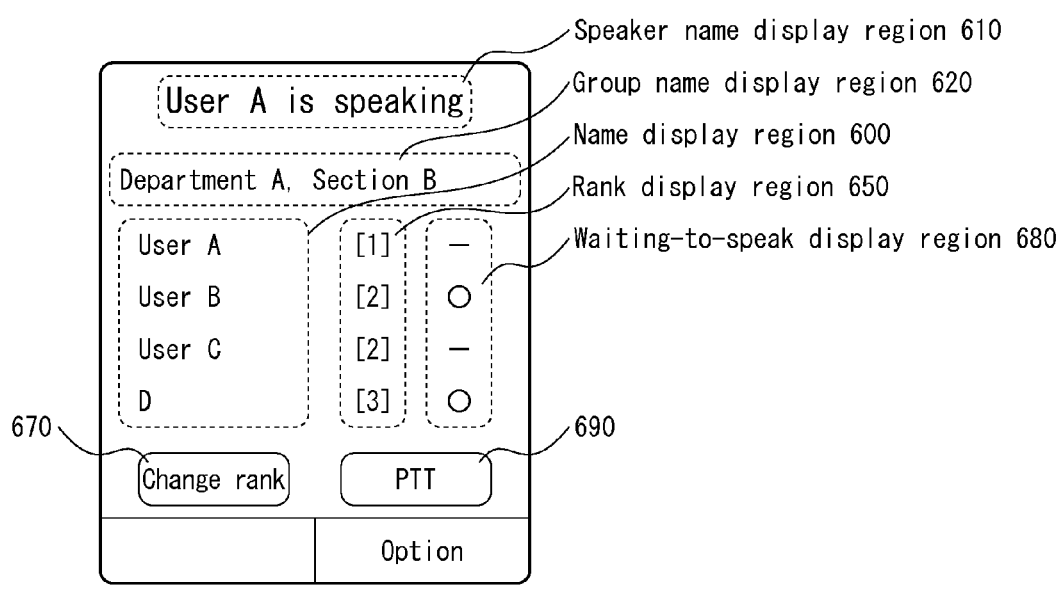
FIG. 6 shows a PTT in-call image.

FIG. 6 shows the PTT in-call image displayed on the liquid crystal display 370 by the display image generator 450.

As shown, the PTT in-call image includes a speaker name display region 610, a group name display region 620, a name display region 600, a rank display region 650, a waiting-to-speak display region 680, a rank change button icon 670, and a PTT button icon 690.

The speaker name display region 610 displays a predetermined text string that includes an entry from the name column 540 corresponding to a speaking flag 570 having a Boolean value of one.

The group name display region 620 displays a text string indicating the group name column 520 entry.

The name display region 600 displays a text string indicating the names in the name column 540 entries. The display position for each name 540 is higher for a smaller corresponding value in the rank column 550. When multiple names 540 have the same rank 550 value, then the display position is made higher for a smaller corresponding value in the sub-rank column 560.

The rank display region 650 displays a text string corresponding to the entry in the rank column 550, to the right-hand side of the corresponding name 540.

The waiting-to-speak display region 680 displays a shape for each entry in the waiting-to-speak flag column 580, at a position having the same height as the text string indicating the corresponding name 540. Here, a waiting-to-speak flag 580 having a Boolean value of one is represented by a circle, and a waiting-to-speak flag 580 having a Boolean value of zero is represented by a dash.

The functions of the display image generator 450 are now described with a return to FIG. 4.

The display of the rank change request operation reception image is performed when the user operation receiver 460 receives a (later-described) rank change request operation, and involves generating an image in response to the received operation and displaying the image on the liquid crystal display 370. The liquid crystal display 370 displays the image as described later.

The user operation receiver 460 is connected to the display image generator 450, the transmit signal generator 470, and the touch pad 380, and is realized by the CPU 300. Specifically, the user operation receiver 460 receives operations as follows.

The user operation receiver 460 receives a touch operation made by the user in a region where a PTT button icon 690 is displayed (hereinafter, a PTT button touch operation) while the PTT in-call image is displayed on the liquid crystal display 370.

The user operation receiver 460 receives a rank change request operation from the user. The rank change request operation is a request made to the server 111 for changing the speaking rights priority rank of the given terminal and of one or more other PTT terminals 100. The rank change request operation also includes three sub-operations, namely a range change request start operation, a change target user selection operation, and a priority rank setting operation.

Figure 7A:
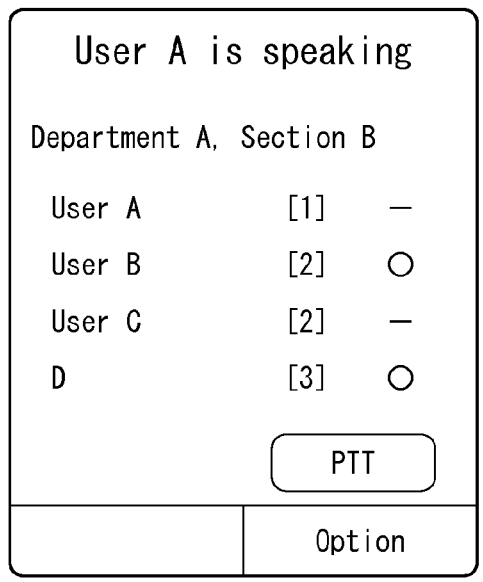
FIG. 7A shows a first image displayed during a rank change request operation.

The range change request start operation is a touch operation made by the user on the rank change button icon 670 while the PTT in-call image is displayed on the liquid crystal display 370. FIG. 7A illustrates the image shown by the display image generator 450 on the liquid crystal display 370 when the user operation receiver 460 receives the range change request start operation.

Figure 7B:
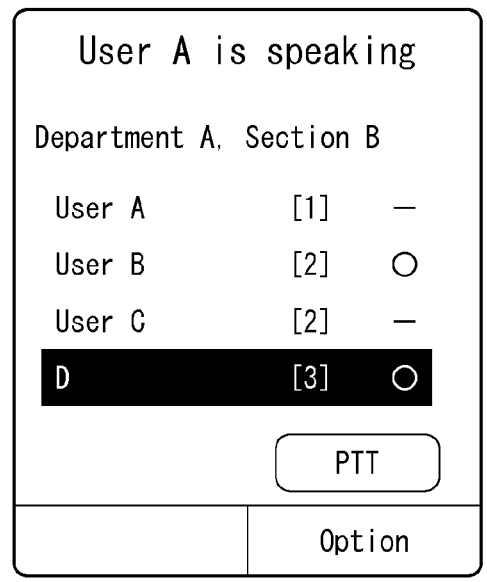
FIG. 7B shows a second image shown during the rank change request operation.

The change target user selection operation involves selecting the PTT terminal 100 that is subject to the speaking rights priority rank change. FIG. 7B illustrates the image shown by the display image generator 450 on the liquid crystal display 370 when the user operation receiver 460 receives the change target user selection operation. As shown, the PTT terminal 100 used by user D (i.e., the given terminal) is indicated as selected.

Figure 7C:
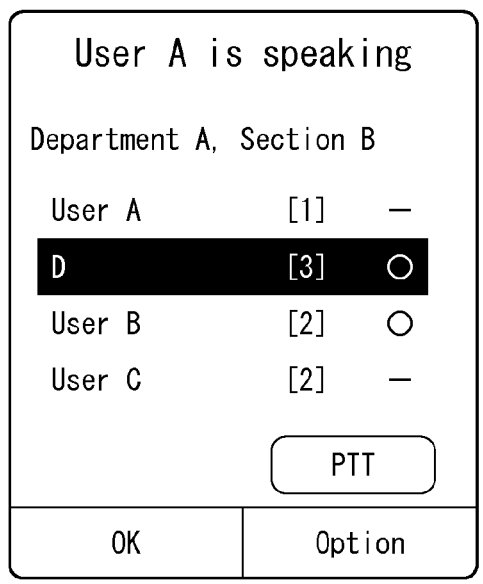
FIG. 7C shows a third image shown during the rank change request operation.

The priority rank setting operation involves setting a new speaking rights priority rank for the PTT terminal 100 selected in the change target user selection operation. FIG. 7C illustrates the image shown by the display image generator 450 on the liquid crystal display 370 when the user operation receiver 460 receives the priority rank change operation. As shown, the new speaking rights priority rank applied by the priority rank setting operation for PTT terminal 100 (i.e., the given terminal) used by user D is lower than the speaking rights priority rank of PTT terminal 100 used by user A, but is higher than the speaking rights priority rank of the PTT terminal 100 used by user B.

The explanation of the functional blocks resumes, with a return to FIG. 4.

The transmit signal generator 470 is connected to the user operation receiver 460 and the modulator 415, and is realized by the CPU 300. The transmit signal generator 4709 mainly executes functions of generating a PTT button touch signal and generating the rank change request signal, as described below.

The generation of the PTT button touch signal is performed while the user operation receiver 460 is receiving the touch operation on the PTT button, at a predetermined interval T1 (e.g., every 100 ms), and involves generating a PTT button touch signal to indicate that the touch operation is being made on PTT button.

The generation of the rank change request signal is performed when the rank change request operation received by the user operation receiver 460 includes an operation to change the speaking rights priority rank of the given terminal, and involves generating a rank change request table 800 based on the rank change request operation and generating the rank change request signal based on the rank change request table 800.

Figure 8:
FIG. 8 shows the data configuration of a rank change request table 800.

FIG. 8 shows the data configuration of the rank change request table 800 generated by the transmit signal generator 470.

As shown, the rank change request table 800 includes a group ID column 810, a name column 840, a tank column 850, and a sub-rank column 860, stored in association.

The group ID column 810, the name column 840, the rank column 850, and the sub-rank column 860 are each identical to the corresponding columns in the terminal group table 500 (see FIG. 5). Explanations therefor have already been given.

The explanation of the functional blocks resumes, with a return to FIG. 4.

The modulator 415 is connected to the transmit signal generator 470, the audio input signal converter 480, and the transmitter 410, and is realized by the communication LSI 310 controlled by the CPU 300. The modulator 415 modulates the signal generated by the transmit signal generator 470 and the signal converted by the audio input signal converter 480 in accordance with a predetermined algorithm and a predetermined frequency band (e.g., 2 GHz).

The transmitter 410 is connected to the antenna 340 and the modulator 415, and transmits the signals modulated by the modulator 415 to the base station 110 using the antenna 340.

<Server 111>

The server 111 is a computer system that includes transmitting and receiving circuits, provided with a CPU that realizes PTT call management by executing a program stored in a memory.

Figure 9:
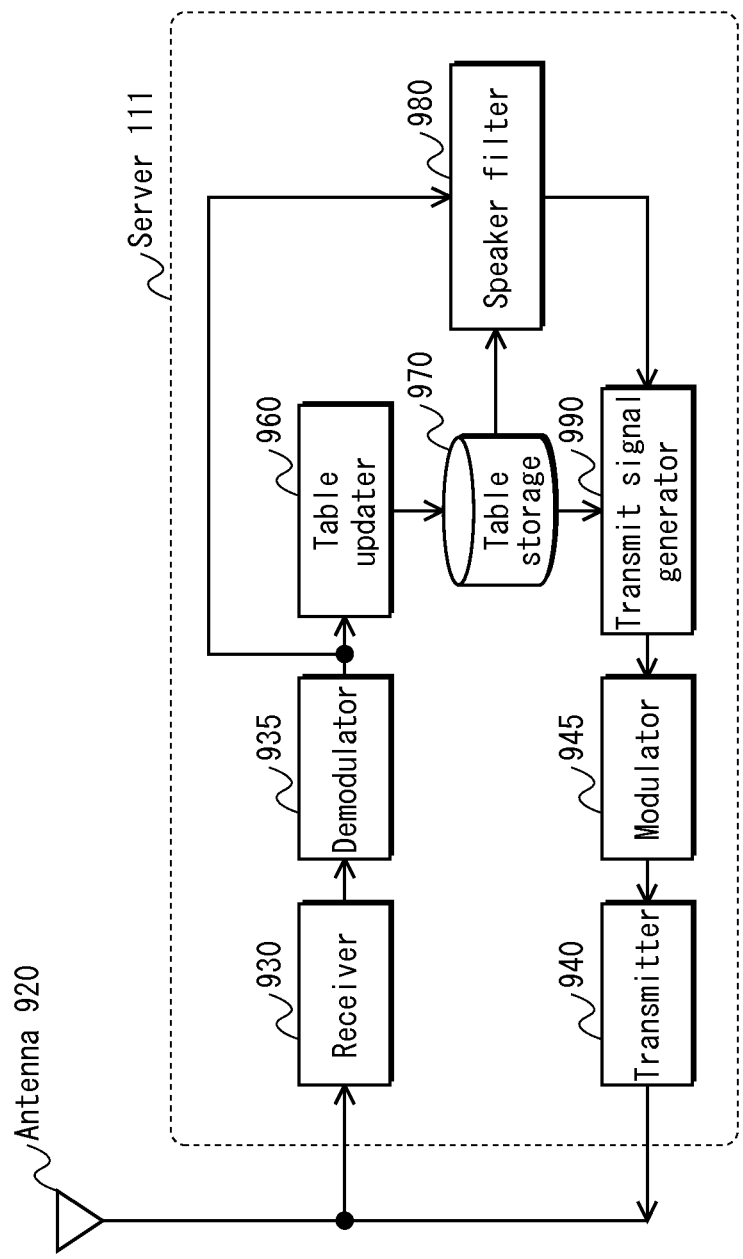
FIG. 9 is a block diagram showing the main functional blocks of a server 111.

FIG. 9 is a functional block diagram of the server 111.

As shown, the server 111 is connected to the base station 110 and to the antenna 920, and includes a receiver 930, a demodulator 935, a determiner 950, a table updater 960, a table storage 970, a speaker filter 980, a transmit signal generator 990, a modulator 945, and a transmitter 940.

The receiver 930 is connected to the antenna 920 and the demodulator 935, and uses the antenna 920 to receive a signal in a set frequency band (e.g., 2 GHz) transmitted from the PTT terminal 100.

The demodulator 935 is connected to the receiver 930, the determiner 950, and the speaker filter 980, and demodulates the signal received by the receiver 930 in accordance with a predetermined algorithm.

The table storage 970 is connected to the table updater 960, the determiner 950, the speaker filter 980, and the transmit signal generator 990, and stores a server group table 1000.

FIG. 10 shows the data configuration of the server group table 1000 stored in the table storage 970.

As shown, the server group table 1000 includes a group ID column 1010, a group name column 1020, an update permission flag 1030, a name column 1040, a rank column 1050, a sub-rank column 1060, a speaking flag column 1070, a waiting to speak flag column 1080, and an update rights flag column 1090, stored in correspondence.

The group ID column 1010, the group name column 1020, the name column 1040, the rank column 1050, the sub-rank column 1060, the speaking flag column 1070, and the waiting to speak flag column 1080 are each identical to the corresponding columns in the terminal group table 500 (see FIG. 5). Explanations therefor have already been given.

The update permission flag column 1030 stores a flag indicating whether or not the group identified by the group ID 1010 has permission to update the content of the rank column 1050 and the sub-rank column 1060. A Boolean value of one indicates permission.

The update rights flag column 1090 stores a flag indicating whether or not the user named in the corresponding entry of the name column 1040 has update rights for the entries in the rank column 1050 and the sub-rank column 1060 corresponding to the group identified by the entry in the group ID column 1010. A Boolean value of one indicates that these rights are granted.

The server group table 1000 is created by a manager managing the server 111 and stored in the table storage 970 in advance. A new group is generated by the manager managing the server 111 editing the server group table 1000.

The explanation of the functional blocks of the server 111 resumes, with a return to FIG. 9.

The table updater 960 is connected to the demodulator 935 and the table storage 970, and performs a rank change update, a waiting-to-speak flag to one update, a waiting-to-speak flag to zero update, a speaking flag to zero update, and a speaking flag to one update.

The rank change update is performed when the signal demodulated by the demodulator 935 includes a rank change request signal and the following predetermined conditions are met, and involves updating the server group table 1000 stored in the table storage 970 in accordance with the rank change request signal. The predetermined conditions are that the server group table 1000 stored in the table storage 970 (1) has a Boolean value of one as the update permission flag column 1030 entry corresponding to the group identified in the group ID column 810 of the rank change request table 800 (see FIG. 8) indicated by the rank change request signal, and (2) has a Boolean value of one as the update rights flag column 1090 entry corresponding to the name column 1040 entry of the PTT terminal 100 that is the sender of the rank change request signal.

The waiting-to-speak flag to one update is performed when the signal demodulated by the demodulator 935 includes the PTT button touch signal transmitted by the PTT terminal 100 having a name column 1040 entry corresponding to a waiting-to-speak flag column 1080 entry storing a Boolean value of zero in the server group table 1000 stored in the table storage 970, and involves updating the waiting-to-speak flag column 1080 entry with a Boolean value of one when the corresponding speaking flag column 1070 entry stores a Boolean value of zero, both being associated with the same entry in the name column 1040.

The waiting-to-speak flag to zero update is performed when the signal demodulated by the demodulator 935 includes the PTT button touch signal transmitted by the PTT terminal 100 having a name column 1040 entry corresponding to a waiting-to-speak flag column 1080 entry storing a Boolean value of one in the server group table 1000 stored in the table storage 970, and involves updating the corresponding waiting-to-speak flag column 1080 entry with a Boolean value of zero when the signal is not transmitted within the predetermined interval T1.

The speaking flag to zero update is performed when the signal demodulated by the demodulator 935 includes the PTT button touch signal transmitted by the PTT terminal 100 having a name column 1040 entry corresponding to a speaking flag column 1070 entry storing a Boolean value of one in the server group table 1000 stored in the table storage 970, and involves updating the speaking flag column 1070 entry with a Boolean value of zero when the signal is not transmitted within the predetermined interval T1.

The speaking flag to one update is performed when the speaking flag column 1070 entry in the server group table 1000 stored in the table storage 970 does not have an entry with Boolean value of one and the waiting-to-speak flag column 1080 has an entry with a Boolean value of one. The update involves updating the speaking flag column 1070 entry corresponding to a waiting-to-speak flag 1080 entry having the lowest corresponding value in the rank column 1050 with a one, and updating the waiting-to-speak flag column 1080 entry corresponding thereto with a zero. When a plurality of speaking flag column 1070 entries correspond each to a waiting-to-speak flag 1080 entry having the lowest corresponding value, then the speaking flag column 1070 entry corresponding to a waiting-to-speak flag 1080 entry having the lowest corresponding value in the sub-rank column 1060 is updated with a one, and the waiting-to-speak flag column 1080 entry corresponding thereto is updated with a zero.

The speaker filter 980 is connected to the demodulator 935, the table storage 970, and the transmit signal generator 990, references the server group table stored in the table storage 970 regarding the audio signal in the signal demodulated by the demodulator 935, and transmits the audio signal to the transmit signal generator 990 only when the audio signal has been transmitted by a PTT terminal 100 associated with a name column entry 1040 having a corresponding entry in the speaking flag column 1070 having a Boolean value of one.

The transmit signal generator 990 is connected to the speaker filter 980, the table storage 970, and the modulator 945, and generates an audio signal, a priority rank signal, and a response signal as described below.

The generation of the audio signal is performed when an audio signal has been transmitted from the speaker filter 980, and involves referencing the server group table stored in the table storage 970 and generating an audio signal based on the received audio signal with another one of the PTT terminals 100 in the same group serving as the destination.

The generation of the priority rank signal is performed when the server group table 1000 stored in the table storage 970 has been updated and involves generating a priority rank signal reflecting the update.

The generation of the response signal is performed when the signal demodulated by the demodulator 935 includes a rank change request signal, and involves generating a (later-described) response signal in response to the rank change request signal.

The modulator 945 is connected to the transmit signal generator 990 and the transmitter 940, and modulates the signal generated by the transmit signal generator 990 in accordance with a predetermined algorithm and a predetermined frequency band (e.g., 2 GHz).

The transmitter 940 is connected to the antenna 920 and the modulator 945, and transmits the signals modulated by the modulator 945 to the PTT terminal 100 using the antenna 920.

The operations of the above-described PTT call system 120 are described in detail below, with reference to the accompanying drawings.

(Operations)

First, overall operations are described pertaining to the PTT call as performed by the server 111 and the PTT terminals 100 as part of the PTT call system 120 realizing the PTT call. Next, the particular operations of the PTT call system 120 are described, specifically a rank display process performed by the PTT terminals 100, a terminal priority rank setting process performed by the PTT terminal 100, and a server priority rank setting process performed by the server 111.

(PTT Call Overview)

Figure 11:
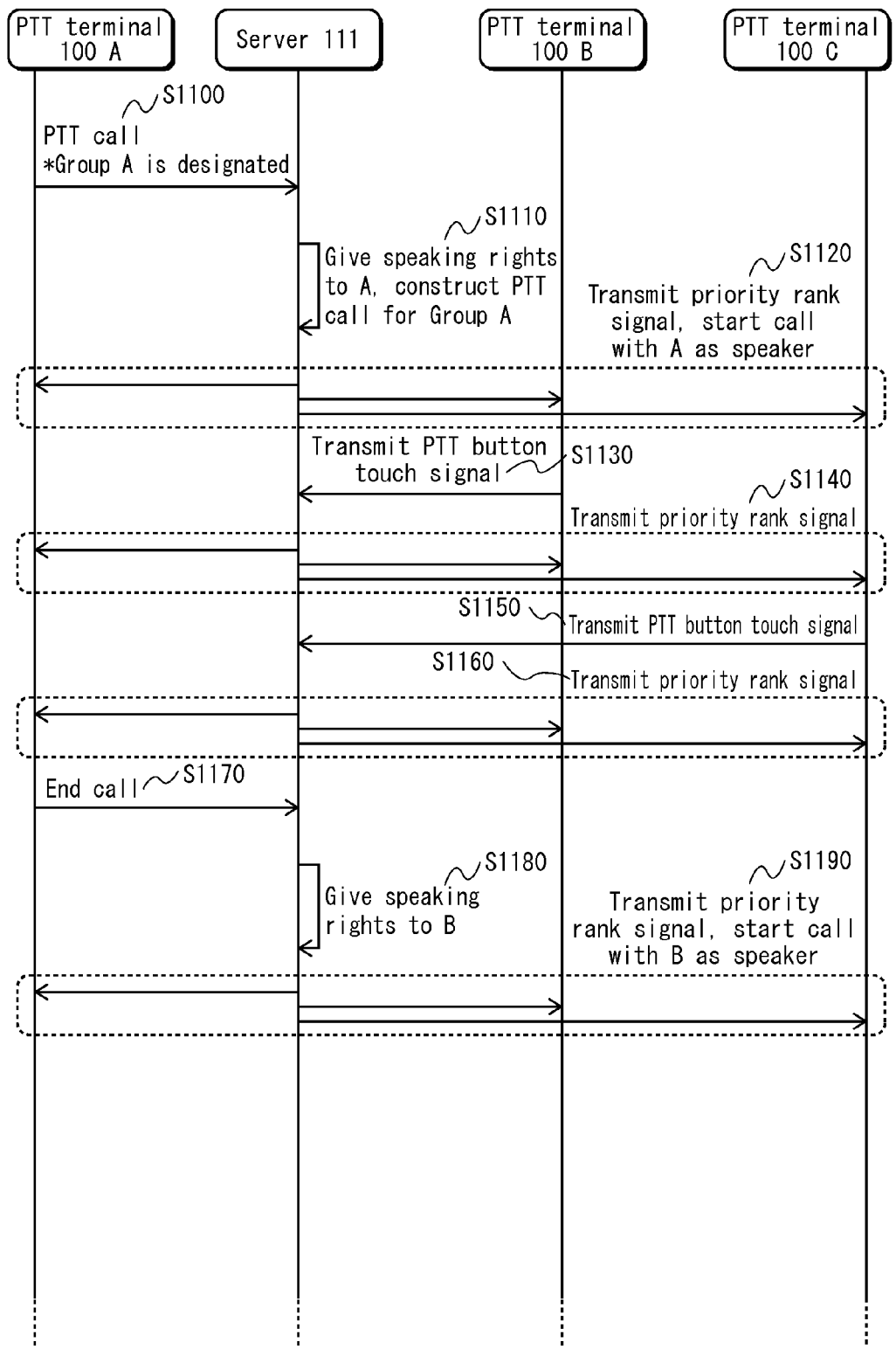
FIG. 11 is a timing chart showing an example of processing performed by the server 111 and the PTT terminals 100 during a PTT call.

FIG. 11 is a timing chart pertaining to an example of the processing performed by the server 111 and the PTT terminals 100 during a PTT call between the server 111 and the PTT terminals 100 A, 100 B, and 100 C.

Here, the PTT terminals 100 A, 100 B, and 100 C belong to group A, the update permission flag for group A has a Boolean value of one, the respective update rights flag column 1090 entries for the PTT terminals 100 A, 100 B, and 100 C each have a Boolean value of one, PTT terminal 100 B has a higher speaking rights priority rank than PTT terminal 100 C in the rank column 1050, and the PTT terminals 100 have not performed the later-described terminal priority rank setting process.

In this example, the PTT call begins with PTT terminal 100A making the PTT call designating group A (i.e., performs the initial PTT call: step S1100).

Once the PTT call designating group A is started, the server 111 A gives speaking rights to PTT terminal 100 A by updating the speaking flag column 1070 entry corresponding to PTT terminal 100A in the server group table 1000 (see FIG. 10) with a Boolean value of one, and constructs the PTT call for group A (step S1110). The server 111 then transmits a priority rank signal to the PTT terminals 100 and the speaker using PTT terminal 100 A begins to speak (step S1120).

In the above example, PTT terminal 100 is given speaking rights first when the PTT call is initiated. However, when the PTT call is constructed in step S1110, speaking rights are not assigned to any of the PTT terminals 100 until an operation for acquiring speaking rights is performed.

Upon receiving the priority rank signal from the server 111, the PTT terminal 100 performs the later-described rank display process, updates the screen displayed on the liquid crystal display 370, and displays the PTT in-call image based on the received priority rank signal. Subsequently, each time the priority rank signal is received from the server 111, the PTT terminals 100 perform the rank display process, update the screen displayed on the liquid crystal display 370, and display the PTT in-call image based on the received priority rank signal. These operations are omitted from the remainder of the explanation, for simplicity.

When PTT terminal 100 B transmits a PTT button touch signal while the speaker using PTT terminal 100 A is speaking (step S1130), the server 111 updates the waiting-to-speak flag column 1080 entry corresponding to PTT terminal 100 B with a Boolean value of one and transmits the priority rank signal to the PTT terminals 100 (step S1140). Then, when PTT terminal 100 C transmits an additional PTT button touch signal (step S1150), the server 111 updates the waiting-to-speak flag column 1080 entry corresponding to PTT terminal 100 C with a Boolean value of one and transmits the priority rank signal to the PTT terminals 100 (step S1160).

When no PTT button touch signal is received from PTT terminal 100 A acting as the speaker for at least a predetermined interval T1 (i.e., speaking ends: step S1170), the server 111 updates the speaking flag column 1070 entry corresponding to PTT terminal 100 A with a Boolean value of zero, updates the speaking flag column 1070 entry corresponding to PTT terminal 100 B with a Boolean value of one, PTT terminal 100 B having the highest speaking rights priority rank among PTT terminals 100 with a corresponding waiting-to-speak flag column 1080 entry having a Boolean value of one, and updates the waiting-to-speak flag column 1080 entry corresponding to PTT terminal 100 B with a Boolean value of zero (step S1180). The server 111 then transmits the priority rank signal to the PTT terminals 100 and starts a new call with PTT terminal 100 B as the speaker (step S1190).

The PTT call continues by repeating steps S1130 through S1190 and the equivalent processing as the speaker changes among PTT terminals 100 A, 100 B, and 100 C, until the PTT call is ended by the server 111.

(Rank Display Process)

The rank display process is performed by the PTT terminals 100 upon receiving the priority rank signal from the server 111, and involves updating the image displayed on the liquid crystal display 370 and displaying a new PTT in-call image based on the received priority rank signal.

Figure 12:
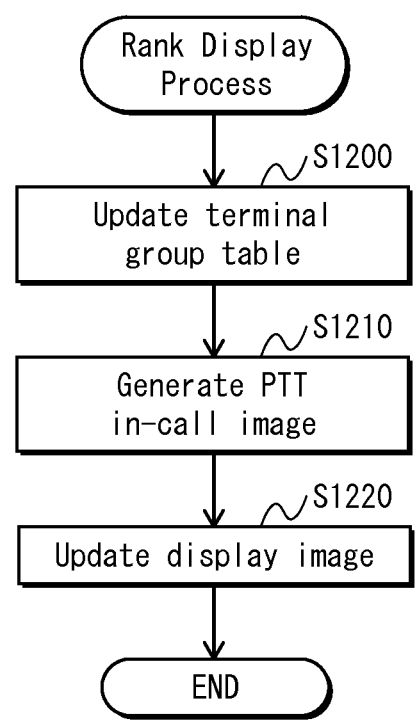
FIG. 12 is a flowchart of a rank display process.

FIG. 12 is a flowchart of the rank display process.

The rank display process begins when the PTT terminal 100 receives the priority rank signal from the server 111.

Once the rank display process begins, the demodulator 405 demodulates the priority rank signal received by the receiver 400. The table updater 530 then generates the terminal group table from the demodulated priority rank signal (see FIG. 5) and updates the terminal group table 500 stored in the table storage 440 in accordance with the generated terminal group table 500 (step S1200).

Once the terminal group table 500 has been updated, the display image generator 450 generates a new PTT in-call image based on the updated terminal group table 500 (step S1210), and updates the image displayed on the liquid crystal display 370 with the newly-generated PTT in-call image (step S1220).

(Terminal Priority Rank Setting Process)

The terminal priority rank setting process is performed by the PTT terminals 100 and involves receiving the rank change request operation from the user of the PTT terminal 100, generating a rank change request signal based on the received rank change request operation and transmitting to the server 111, and receiving a (later-described) response signal transmitted by the server 111 in response to the transmitted rank change request signal.

Figure 13:
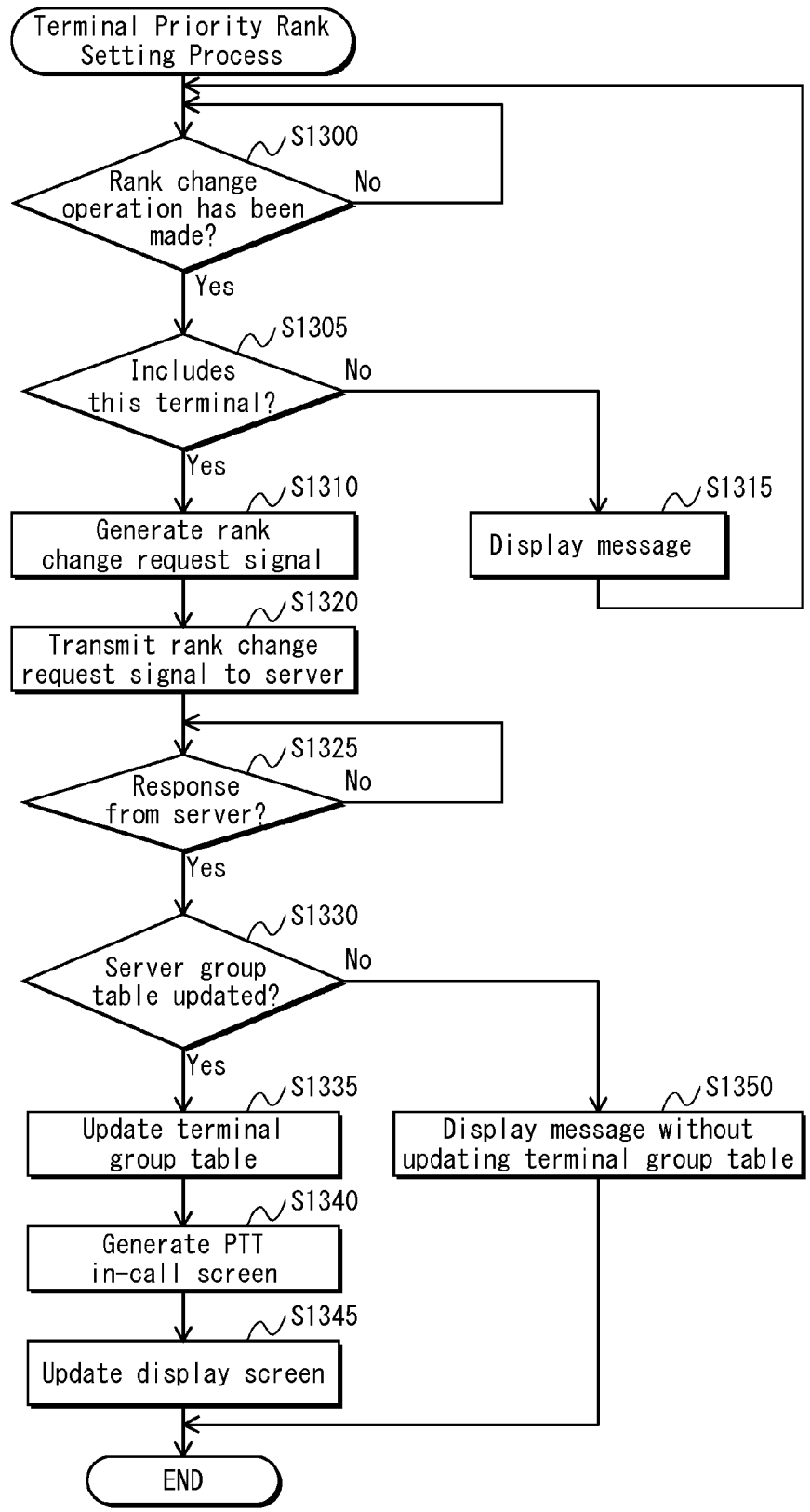
FIG. 13 is a flowchart of a terminal priority rank setting process.

FIG. 13 is a flowchart of the terminal priority rank setting process.

The terminal priority rank setting process begins when the user makes a touch operation on the change button icon 670 (see FIG. 6) while the PTT in-call image is displayed on the liquid crystal display 370.

Once the terminal priority rank setting begins, the user operation receiver 460 waits for the user of a given terminal to make a rank change request operation (repeating No in step S1300).

Once the user makes the rank change request operation (see FIGS. 7A-7C, Yes in step S1300), the user operation receiver 460 receives the rank change request operation. The transmit signal generator 470 then checks whether or not the received rank change request operation includes a change to the speaking rights priority rank of the given terminal (step S1305).

In the affirmative case (Yes in step S1305), the transmit signal generator 470 generates the rank change request table 800 based on the rank change request operation and generates a rank change request signal indicating the generated rank change request table 800 (step S1310).

In the negative case (No in step S1305), the display image generator 450 displays a message to the effect that no speaking rights priority rank change operation is included on the liquid crystal display 370 (step S1315). The PTT terminal 100 then returns to step S1300 and repeats the process beginning at step S1300.

Once the processing of step S1310 is complete, the modulator 415 modulates the rank change request signal. The transmitter 410 transmits the modulated rank change request signal to the server 111 (step S1320).

Once the transmitter 410 transmits the rank change request signal to the server 111, the table updater 430 waits for the demodulator 405 to demodulate a response signal transmitted by the server 111 in response to the rank change request signal (repeating No in step S1325). The response signal is a signal transmitted by the server 111 in response to the rank change request signal transmitted by the PTT terminal 100. The server 111 uses this signal to indicate whether or not the server group table 1000 stored thereby has been updated, based on the rank change request signal. The response signal includes the priority rank signal based on the updated server group table 1000 when the server group table 1000 has been updated.

Once the demodulator 405 demodulates the response signal (Yes in step S1325), the table updater 430 checks whether or not the response signal indicates that the server 111 has updated the server group table 1000 (step S1330).

In the affirmative case (Yes in step S1330), the table updater 430 generates the terminal group table from the priority rank signal that includes the response signal and updates the terminal group table 500 stored in the table storage 440 according to the generated terminal group table 500 (step S1335).

Once the terminal group table 500 has been updated, the display image generator 450 generates a new PTT in-call image based on the updated terminal group table 500 (step S1340), and updates the image displayed on the liquid crystal display 370 with the newly-generated PTT in-call image (step S1345).

In the negative case (No in step S1330), the table updater 430 does not update the terminal group table 500 stored in the table storage 440 and the display image generator 450 displays a message on the liquid crystal display 370 indicating that the server 111 has not updated the server group table 1000 (step S1350).

Once the processing of step S1345 is complete, or when the processing of step S1340 is complete, the PTT terminal 100 ends the terminal priority rank setting.

(Server Priority Rank Setting Process)

The server priority rank setting process is performed by the server 111 upon receiving the rank change request signal from one of the PTT terminals 100, and involves updating the stored server group table 1000 in accordance with the received rank change request signal and transmitting a response signal to the PTT terminal 100 in response to the received rank change request signal.

Figure 14:
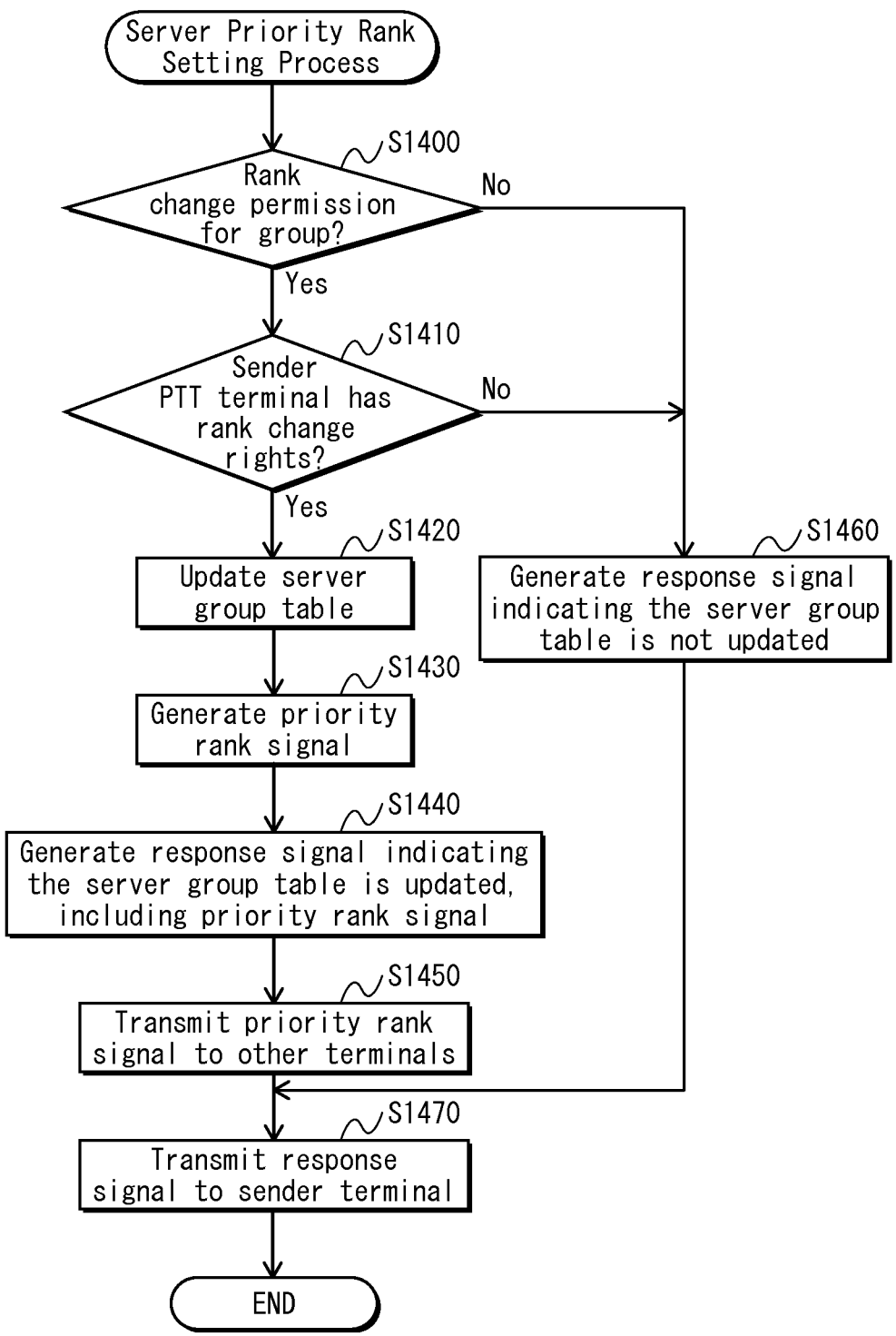
FIG. 14 is a flowchart of a server priority rank setting process.

FIG. 14 is a flowchart of the server priority rank setting process.

The server priority rank setting process begins when the server 111 receives the rank change request signal from one of the PTT terminals 100.

Once the server priority rank setting process begins, the table updater 960 checks whether or not the update permission flag column 1030 entry corresponding to the group identified by the group ID column 810 entry in the rank change request table 800 (see FIG. 8) stores a Boolean value of one (step S1400).

In the affirmative case (Yes in step S1400), the table updater 960 then checks the server group table 1000 stored in the table storage 970 to find whether or not there is a Boolean value of one in the update rights flag column 1090 entry corresponding to the name column 1040 entry for the PTT terminal 100 that transmitted the received rank change request signal (step S1410).

In the second affirmative case (Yes in step S1410), the table updater 960 updates the server group table 1000 stored in the table storage 970 based on the received rank change request signal (step S1420).

Once the server group table 1000 is updated, the transmit signal generator 990 generates a priority rank signal (step S1430) and additionally generates a response signal, which includes the generated priority rank signal, indicating that the server group table 1000 has been updated (step S1440). Here, the destination for the generated priority rank signal is one of the PTT terminals 100 that is not the PTT terminal 100 that transmitted the priority rank change request signal, among the PTT terminals 100 belonging to the group identified by the group ID column 810 entry in the rank change request table 800 indicated by the received rank change request signal. The destination for the generated response signal is the PTT terminal 100 that transmitted the received rank change request signal.

Once the priority rank signal and the response signal are generated, the modulator 945 modulates the generated priority rank signal. The transmitter 940 then transmits the modulated priority rank signal to the respective destination PTT terminals 100 (step S1450).

In the negative cases (No in step S1400 or No in step S1410), the transmit signal generator 990 generates a response signal indicating that the server group table 1000 has not been updated (step S1460). Here, the destination for the generated response signal is the PTT terminal 100 that transmitted the received rank change request signal.

Once the processing of step S1450 or step S1460 is complete, the modulator 945 modulates the generated response signal. The transmitter 940 then transmits the modulated priority rank signal to the destination PTT terminal 100 (step S1470).

According to the PTT call system configured as described above, the PTT terminals 100 participating in a PTT call each display a PTT in-call image on the liquid crystal display 370 indicating the speaking rights priority rank for each terminal participating in the PTT call.

Thus, the user of each PTT terminal 100 wanting to receive speaking rights and making a request to that effect to the server 111 during the PTT call is easily able to know how much longer to wait until the terminal in use is granted the speaking rights.

(Other Embodiments)

(Overview)

The following describes a mobile communication device pertaining to the disclosure, in which a PTT terminal 1700 is similar to the PTT terminal 100 of the above Embodiment with some points of difference, the PTT terminal 1700 being provided in plurality, and in which a PTT call system is similar to the PTT call system 120 of the Embodiment with some points of difference and includes a server 1511 that is similar to the server 111 of the Embodiment with some points of difference.

The PTT terminal 1700 has the same software configuration as the PTT terminal 100 of the Embodiment. However, the software executed by the PTT terminal 1700 and the data stored therein may partially differ from the PTT terminal 100. Also, the server 1511 has the same software configuration as the server 111 of the Embodiment. However, the software executed by the server 1511 and the data stored therein may partially differ from the server 111.

The PTT call system 120 of the Embodiment displays an image on the liquid crystal display 370 while the PTT terminal 100 in in a call that is structured like the example of the PTT in-call image (see FIG. 6). In contrast, the PTT call system of the other Embodiment displays an image on the liquid crystal display 370 while the PTT terminal 1700 is in a call that is structured like the example of the (later-described) second PTT in-call image, which partially differs from the PTT in-call image of the Embodiment.

The PTT call system pertaining to the other Embodiment is described below, with reference to the accompanying drawings and with attention to the points of difference from the PTT call system 120 pertaining to the Embodiment.

(Configuration)

<Server 1511>

Figure 15:
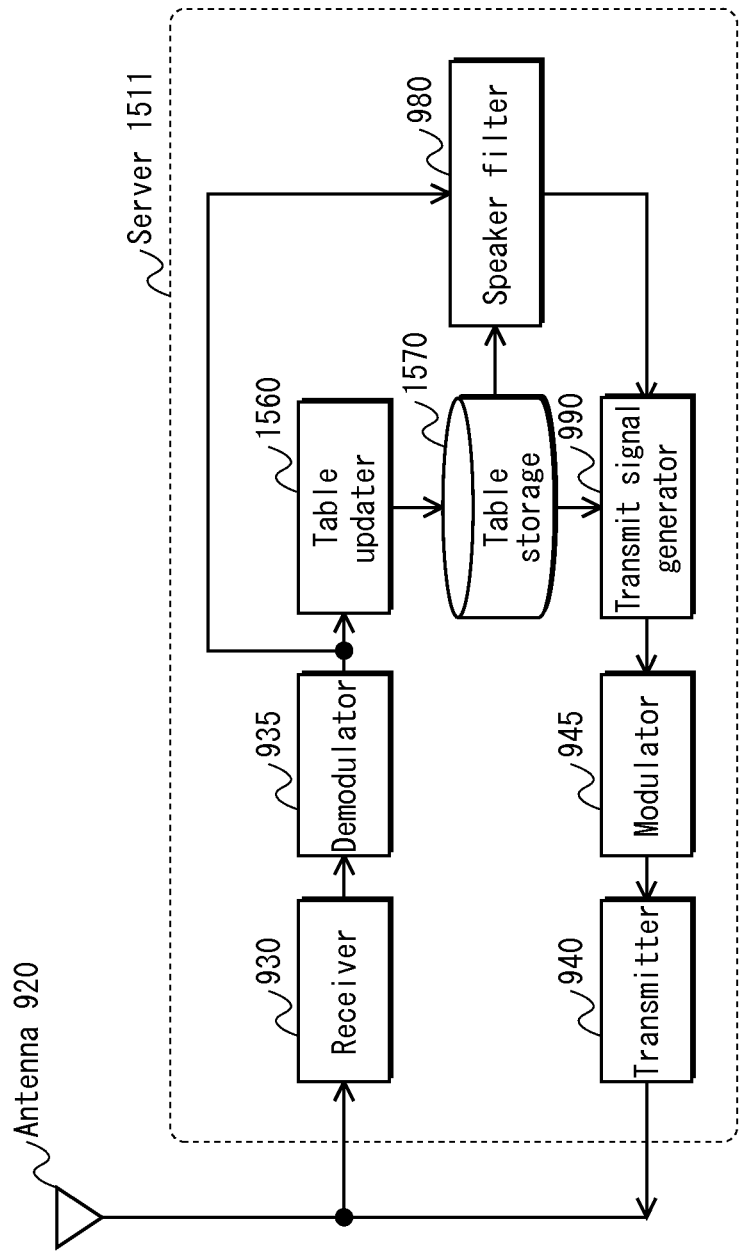
FIG. 15 is a block diagram showing the main functional blocks of a server 1511.

FIG. 15 is a functional block diagram showing the main functional blocks realizing the functions of the server 1511.

As shown, the server 1511 differs from the server 111 in that the table updater 960 is replaced with a table updater 1560 and the table storage 970 is replaced with a table storage 1570.

The table storage 1570 is connected to the table updater 960, the determiner 950, the speaker filter 980, and the transmit signal generator 990, and stores a server group table 1600 that differs in part from the server group table 1000 of the Embodiment.

FIG. 16 shows the data configuration of the server group table 1600 stored in the table storage 1570.

As shown, the server group table 1600 differs from the server group table 1000 of the Embodiment in that a waiting-to-speak rank column 1695 has been added.

The waiting-to-speak rank column 1695 indicates a speaking rights priority rank (hereinafter termed a waiting-to-speak speaking rights priority rank) for a PTT terminal 1700 having a Boolean value of one in the corresponding waiting-to-speak flag column 1080 entry. For the waiting-to-speak speaking rights priority rank, a smaller value indicates a higher rank. In FIG. 16, the waiting-to-speak rank column 1695 indicates a hyphen when the waiting-to-speak rank 1695 column entry has a null value, which in turn indicates that the corresponding entry in the waiting-to-speak flag column 1080 is a Boolean value of one.

The table updater 1560 is connected to the demodulator 935 and the table storage 1570, and performs the below-described update to the waiting-to-speak rank in addition to the five functions of the table updater 960 described in the Embodiment.

The update to the waiting-to-speak rank is performed when the waiting-to-speak flag column 1080 has been updated in the server group table 1600 stored in the table storage 1570, and involves calculating a waiting-to-speak speaking rights priority rank for each PTT terminal 1700 belonging to the group corresponding to the updated waiting-to-speak flag column entry and having a Boolean value of one in the corresponding waiting-to-speak flag column 1080 entry, and updating the waiting-to-speak rank column 1695 entries for each member of that group.

(PTT Terminal 1700)

Figure 17:
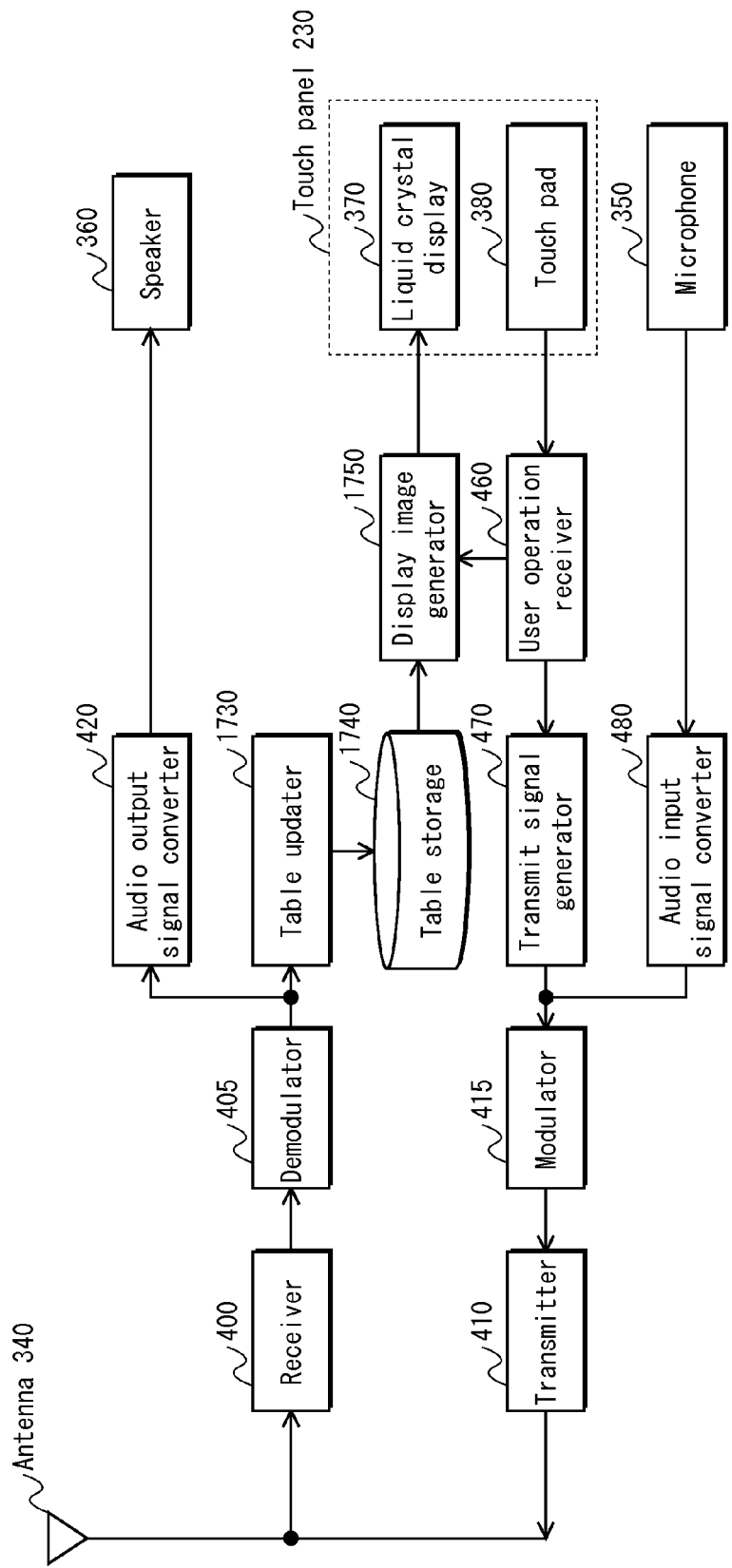
FIG. 17 is a block diagram showing the main functional blocks of a PTT terminal 1700.
Figure 19:
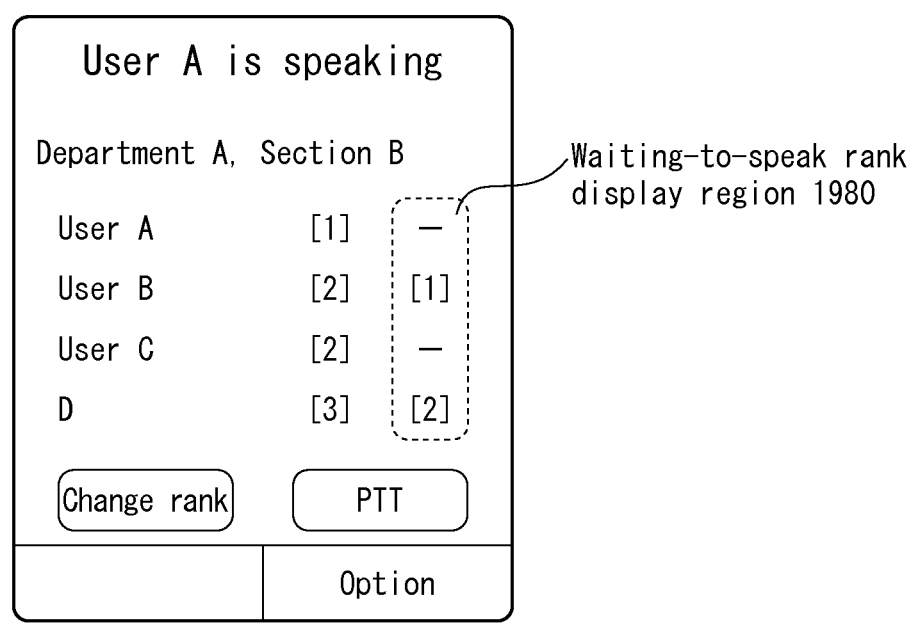
FIG. 19 shows a PTT in-call image.

FIG. 17 is a functional block diagram showing the main functional blocks realizing the functions of the PTT terminal 1700.

As shown, the PTT terminal 1700 differs from the PTT terminal 100 of the Embodiment in that the table updater 430 is replaced by a table updater 1730, the table storage 440 is replaced by a table storage 1740, and the display image generator 450 is replaced by a display image generator 1750.

The table storage 1740 is connected to the table updater 1730 and the display image generator 1750, and partially differs from the terminal group table 500 of the Embodiment (see FIG. 5) in storing the terminal group table 1800.

FIG. 18 shows the data configuration of the terminal group table 1800 stored in the table storage 1740.

As shown, the server group table 1600 differs from the terminal group table 500 of the Embodiment in that a waiting-to-speak rank column 1895 has been added.

The waiting-to-speak rank column 1895 is identical to the waiting-to-speak rank column 1695 of the server group table 1600. Explanations therefor have already been given.

The explanation of the functional blocks resumes, with a return to FIG. 17.

The table updater 1730 is connected to the demodulator 405 and the table storage 1740, generates the terminal group table 1800 from the priority rank signal within the signal demodulated by the demodulator 405, and updates the terminal group table 1800 stored in the table storage 1740 with the generated terminal group table 1800.

The display image generator 1750 is connected to the table storage 1740, the user operation receiver 460, and the liquid crystal display 370, and displays the below-described second PTT in-call image in addition to displaying the rank change request operation reception image as performed by the display image generator 450 of the Embodiment.

The second PTT in-call image display is performed when the terminal is in a PTT call, and involves generating a second PTT in-call image based on the terminal group table 1800 stored in the table storage 1740 and displaying the generated image on the liquid crystal display 370.

FIG. 190 shows the second PTT in-call image displayed on the liquid crystal display 370 by the display image generator 1750.

As shown, the second PTT in-call image differs from the PTT in-call image of the Embodiment (see FIG. 6) in that the waiting-to-speak display region 680 has been deleted and that a waiting-to-speak rank display region 1980 has been added.

The waiting-to-speak rank display region 1980 is a region in which the values in the waiting-to-speak rank column 1895 of the terminal group table 1800 stored in the table storage 1740 are each displayed at a position having the same height as the text string indicating the corresponding name column 540 entry. Here, a null value in the waiting-to-speak rank column 1895 is represented by a hyphen.

According to the PTT call system configured as described above, the PTT terminals 1700 participating in a PTT call each display a second PTT in-call image on the liquid crystal display 370 indicating the waiting-to-speak rank for each terminal participating in the PTT call.

Thus, the user of each PTT terminal 1700 wanting to receive speaking rights and making a request to that effect to the server 1511 is easily able to know how much longer to wait until the terminal in use is granted the speaking rights. (Supplement)

The mobile communication terminals pertaining to the Embodiment of the disclosure and to the other Embodiment are each described with reference to the examples of the PTT terminal 100 and the PTT terminal 1700. However, the variations described below are also applicable. No particular limitation is intended to the mobile communication terminals of the above-described Embodiment or the other Embodiment.

(1) In the Embodiment, the PTT terminal 100 displays the PTT in-call image on the liquid crystal display 370, which is configured to include displays of each paired entry in the name column 540, the rank column 550, and the sub-rank column 560 as associated in the terminal group table 500 stored in the table storage 440 (see FIG. 6). However, the PTT in-call image displayed on the liquid crystal display 370 is not limited to this configuration, provided that at least one pair of entries in the name column 540, the rank column 550, and the sub-rank column 560 as associated in the terminal group table 500 stored in the table storage 440 is displayed. For example, the PTT in-call image displayed on the liquid crystal display 370 may include only pairs of information for terminals having a higher speaking priority than the given terminal.

(2) In the Embodiment, the given PTT terminal 100 has the user operation receiver 460 that receives the user operation making a request to the server 111 for changing the speaking rights priority rank of one or more PTT terminals 100, including the given terminal 100. However, in another example, the user operation receiver 460 may receive a user operation for making a request to the server 111 for changing the speaking rights priority rank of one or more PTT terminals 100 not including the given terminal. Also, in another example, the user operation receiver 460 may not receive the user operation for making a request to the server 111 for changing the speaking rights priority rank of any PTT terminals 100.

(3) In the Embodiment, the PTT terminal 100 is a mobile communication terminal realized as a smartphone. However, no limitation to a smartphone is intended, provided that the functions of the PTT terminal 100 are provided. For example, a flip phone may be used, or a tablet computer having network functionality may be used.

(4) In the Embodiment, a new group is generated by a manager managing the server editing the server group table 1000. However, the user of the PTT terminal 100 may also generate a ne group by operating the PTT terminal 100. For example, when an operation for generating a new group is made by the user of the given PTT terminal 100, a new terminal group table 500 that includes the new group may be generated and transmitted to the server 111. Upon receiving the new terminal group table 500 that includes the new group transmitted by the PTT terminal 100, the server 111 generates and stores a new server group table 1000 based on the received terminal group table 500.

(5) The above-described Embodiments and variations may be freely combined.

(6) Aspects of the mobile communication device pertaining to the disclosure are further described below, along with variations and the effects thereof.

(a) In one aspect a mobile communication terminal used in a communication system in which audio based on an audio signal transmitted from a given mobile communication terminal having speaking rights is output from another mobile communication terminal, the given mobile communication terminal being selected by a server storing priority rank information indicating a priority rank pertaining to acquisition of the speaking rights for each of a plurality of mobile communication terminals, the mobile communication terminal comprising: a rank signal receiver receiving, from the server, a priority rank signal based on the priority rank information stored by the server and indicating the priority rank for at least a subset of the mobile communication terminals; and a display displaying a terminal priority rank based on the priority rank signal when the rank signal receiver receives the priority rank signal.

According to the mobile communication terminal pertaining to the above-described aspect, the priority rank is at least partially displayed on the display unit. Thus, during a PTT call, a user is more likely to know how much longer to wait before speaking rights are granted to the user's terminal, in comparison to conventional technology.

(b) In another aspect, the priority rank signal transmitted by the server indicates the terminal priority rank for all of the mobile communication terminals, and the display displays the terminal priority rank for all of the mobile communication terminals.

Accordingly, when the user makes a request to the server for speaking rights to be granted to the user's terminal during the PTT call, the user is more likely to know how much longer to wait before speaking rights are granted to the user's terminal.

(c) In a further aspect, a request receiver receiving a priority rank change request from a user using the mobile communication terminal, for changing the priority rank information stored by the server; and a request transmitter transmitting a priority rank change request signal to the server indicating the priority rank change request when the request receiver receives the priority rank change request.

Accordingly, making a request to the server to change the priority rank information stored in the server is made possible.

(d) In yet another aspect, the request transmitter transmits the priority rank change request signal when the priority rank change request indicates a priority rank change for at least the mobile communication terminal used by the user making the priority rank change request.

Accordingly, the request made to the server to change the priority order information is made with a limitation to cases where the terminal making the request is involved in the priority rank change.

(e) In still another aspect, the rank signal receiver further receives a planned selection signal that includes speaking rights plan information specifying one of the mobile communication terminals to which the server plans to assign the speaking rights, and the display unit further displays the one of the mobile communication terminals specified by the speaking rights plan information when the rank signal receiver receives the speaking rights plan information.

Accordingly, when the user makes a request to the server for speaking rights to be granted to the user's terminal during the PTT call, the user is more likely to know how much longer to wait before speaking rights are granted to the user's terminal.

(f) In yet a further aspect, the rank signal receiver further receives a planned selection signal transmitted from the server and including planned selection rank information indicating two or more selection stand-by mobile communication terminals to which the server plans to assign the speaking rights, and the display unit further displays a planned speaking rights order in accordance with the planned selection signal when the rank signal receiver receives the planned selection signal.

Accordingly, when the user makes a request to the server for speaking rights to be granted to the user's terminal during the PTT call, the user is more likely to know how much longer to wait before speaking rights are granted to the user's terminal.

(g) In still a further aspect, a communication system includes a plurality of mobile communication terminals and a server, in which audio based on an audio signal transmitted from one of the mobile communication terminals selected by the server and having speaking rights is output to another one of the mobile communication terminals, wherein the server includes: a storage storing priority rank information indicating a priority rank pertaining to speaking rights acquisition for each of the mobile communication terminals; and a transmitter transmitting, to each of the mobile communication terminals, a priority rank signal based on the priority rank information stored in the storage and indicating the priority rank for at least a subset of the mobile communication terminals, wherein the server assigns the speaking rights in accordance with the priority rank information stored in the storage, and each of the mobile communication terminals includes: a rank signal receiver receiving the priority rank signal from the server; and a display displaying a terminal priority rank based on the priority rank signal when the rank signal receiver receives the priority rank signal.

According to the communication system configured as described above, the mobile communication terminals display at least part of the priority rank stored on the server. Thus, during the PTT call, the user is more likely to know how much longer to wait before speaking rights are granted to the user's terminal.

INDUSTRIAL APPLICABILITY

The present disclosure is widely applicable to mobile communication terminals having a PTT call function.

REFERENCE SIGNS LIST

400 Receiver
405 Demodulator
410 Transmitter
415 Modulator
420 Audio output signal converter
430 Table updater
440 Table storage
450 Display image generator
460 User operation receiver
470 Transmit signal generator
480 Audio input signal converter
340 Antenna
350 Microphone
360 Speaker
370 Liquid crystal display
380 Touch pad
230 Touch panel

The invention claimed is:

1. A mobile communication terminal used in a communication system in which audio based on an audio signal transmitted from a given mobile communication terminal having speaking rights is output from another mobile communication terminal, the given mobile communication terminal being selected by a server storing priority rank information indicating a priority rank pertaining to acquisition of the speaking rights for each of a plurality of mobile communication terminals, the mobile communication terminal comprising:
 a rank signal receiver that receives, from the server, during a group call between the plurality of mobile communication terminals, a priority rank signal based on the priority rank information stored by the server, wherein the priority rank signal indicates the priority rank, in acquiring speaking rights, for each of two or more of the plurality of mobile communication terminals;
 a display that, when the rank signal receiver receives the priority rank signal during the group call between the plurality of mobile communication terminals, displays during the group call, for each of the two or more mobile communication terminals, a terminal priority rank for that mobile communication terminal based on the priority rank signal, wherein the terminal priority rank indicates a priority for acquiring a speaking right by that mobile communication terminal,
 an operation receiver that receives a predetermined operation for starting a control for changing the priority rank pertaining to acquisition of the speaking rights; and
 a controller that starts the control based on the predetermined operation,
 wherein, after starting the control, the controller causes the operation receiver to refrain from receiving further predetermined operations at least during execution of the control,
 wherein the display further displays a predetermined image,
 the operation receiver receives a touch operation to the predetermined image as the predetermined operation, and
 the controller causes the operation receiver to refrain from receiving the further predetermined operations at least during the execution of the control by causing the display to refrain from displaying the predetermined image.

2. The mobile communication terminal of claim 1, wherein
 the priority rank signal transmitted by the server indicates the terminal priority rank for all of the plurality of mobile communication terminals, and
 the display displays the terminal priority rank for all of the plurality of mobile communication terminals.

3. The mobile communication terminal of claim 1, further comprising:
 a request receiver that receives a priority rank change request, from a user using the mobile communication terminal, for changing the priority rank information stored by the server; and
 a request transmitter that transmits a priority rank change request signal to the server indicating the priority rank change request when the request receiver receives the priority rank change request.

4. The mobile communication terminal of claim 3, wherein the request transmitter transmits the priority rank change request signal when the priority rank change request indicates a priority rank change for at least the mobile communication terminal used by the user making the priority rank change request.

5. The mobile communication terminal of claim 4, wherein
the rank signal receiver further receives a planned selection signal that includes speaking rights plan information specifying one of the plurality of mobile communication terminals to which the server plans to assign the speaking rights, and
the display unit further displays the one of the mobile communication terminals specified by the speaking rights plan information when the rank signal receiver receives the speaking rights plan information.

6. The mobile communication terminal of claim 4, wherein
the rank signal receiver, during the group call, further receives a planned selection signal transmitted from the server and including planned selection rank information indicating two or more selection stand-by mobile communication terminals to which the server plans to assign the speaking rights, and
the display unit further displays, during the group call, a planned speaking rights order in accordance with the planned selection signal when the rank signal receiver receives the planned selection signal.

7. A communication system including a plurality of mobile communication terminals and a server, in which audio based on an audio signal transmitted from one of the plurality of mobile communication terminals selected by the server and having speaking rights is output to another one of the plurality of mobile communication terminals,
wherein the server includes
a storage storing priority rank information indicating a priority rank pertaining to speaking rights acquisition for each of the plurality of mobile communication terminals engaged in a group call, and
a transmitter transmitting, during the group call, to each of the plurality of mobile communication terminals, a priority rank signal based on the priority rank information stored in the storage, wherein the priority rank signal indicates the priority rank, in acquiring speaking rights, for each of two or more of the plurality of mobile communication terminals,
wherein the server assigns the speaking rights in accordance with the priority rank information stored in the storage;
wherein each of the mobile communication terminals includes
a rank signal receiver that receives, during the group call between the plurality of mobile communication terminals, the priority rank signal from the server, wherein the priority rank signal indicates the priority rank, in acquiring speaking rights, for each of two or more of the plurality of mobile communication terminals,
a display that, when the rank signal receiver receives the priority rank signal during the group call between the plurality of mobile communication terminals, displays, during the group call, for each of the two or more mobile communication terminals, a terminal priority rank for that mobile communication terminal based on the priority rank signal,
an operation receiver that receives a predetermined operation for starting a control for changing the priority rank pertaining to acquisition of the speaking rights; and
a controller that starts the control based on the predetermined operation,
wherein, after starting the control, the controller causes the operation receiver to refrain from receiving further predetermined operations at least during execution of the control,
wherein the display further displays a predetermined image,
the operation receiver receives a touch operation to the predetermined image as the predetermined operation, and
the controller causes the operation receiver to refrain from receiving the further predetermined operations at least during the execution of the control by causing the display to refrain from displaying the predetermined image.

8. A mobile communication terminal used in a communication system in which audio, based on an audio signal transmitted from a given mobile communication terminal having speaking rights, is output from another mobile communication terminal, the given mobile communication terminal being selected by a server storing priority rank information indicating a priority rank pertaining to acquisition of the speaking rights for each of a plurality of mobile communication terminals, the mobile communication terminal comprising:
a rank signal receiver that receives, from the server, during a group call between the plurality of mobile communication terminals, a priority rank signal based on the priority rank information stored by the server, wherein the priority rank signal indicates the priority rank for at least a subset of the plurality of mobile communication terminals;
a display that, during the group call, displays a terminal priority rank based on the priority rank signal when the rank signal receiver receives the priority rank signal;
an operation receiver that receives a predetermined operation for starting a control for changing the priority rank pertaining to acquisition of the speaking rights; and
a controller that starts the control based on the predetermined operation,
wherein, after starting the control, the controller causes the operation receiver to refrain from receiving further predetermined operations at least during execution of the control,
wherein the display further displays a predetermined image,
the operation receiver receives a touch operation to the predetermined image as the predetermined operation, and
the controller causes the operation receiver to refrain from receiving the further predetermined operations at least during the execution of the control by causing the display to refrain from displaying the predetermined image.

9. The mobile communication terminal of claim 8, wherein
the priority rank signal transmitted by the server indicates the terminal priority rank for all of the plurality of mobile communication terminals, and
the display displays the terminal priority rank for only the mobile communication terminal and ones of the plurality of mobile communication terminals whose terminal priority rank is higher than the mobile communication terminal.

* * * * *